(12) United States Patent
Shiraishi

(10) Patent No.: US 11,290,647 B2
(45) Date of Patent: Mar. 29, 2022

(54) LENS APPARATUS, IMAGE PICKUP APPARATUS, AND CAMERA SYSTEM

(71) Applicant: CANON KABUSHIKI KAISHA, Tokyo (JP)

(72) Inventor: Daisuke Shiraishi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 16/583,086

(22) Filed: Sep. 25, 2019

(65) Prior Publication Data

US 2020/0112680 A1 Apr. 9, 2020

(30) Foreign Application Priority Data

Oct. 4, 2018 (JP) .............................. JP2018-189287

(51) Int. Cl.
*H04N 5/232* (2006.01)
*G02B 27/64* (2006.01)
*G02B 7/02* (2021.01)
*D04H 1/10* (2006.01)
*G03B 17/56* (2021.01)

(52) U.S. Cl.
CPC ....... *H04N 5/23264* (2013.01); *G02B 27/646* (2013.01); *D04H 1/10* (2013.01); *G02B 7/02* (2013.01); *G03B 17/566* (2013.01)

(58) Field of Classification Search
CPC ......................... H04N 5/23264; G02B 27/646
See application file for complete search history.

(56) References Cited

U.S. PATENT DOCUMENTS

| 5,581,032 | A | * | 12/1996 | Uemura | ............ G01C 19/5607 73/493 |
| 7,499,635 | B2 | | 3/2009 | Tanaka | |
| 8,803,986 | B2 | * | 8/2014 | Sato | ....................... H02N 2/163 348/208.5 |
| 2009/0269046 | A1 | * | 10/2009 | Yamazaki | .......... H04N 5/23258 396/55 |
| 2009/0282915 | A1 | * | 11/2009 | Ohta | ..................... B81B 7/0058 73/504.12 |
| 2012/0268642 | A1 | * | 10/2012 | Kawai | .................. G02B 27/646 348/335 |
| 2017/0219527 | A1 | * | 8/2017 | Brignac | ............... G01N 27/902 |

FOREIGN PATENT DOCUMENTS

| JP | 2004-302376 A | 10/2004 |
| JP | 2005-202261 A | 7/2005 |

* cited by examiner

*Primary Examiner* — Clayton E. LaBalle
*Assistant Examiner* — Diana Hancock
(74) *Attorney, Agent, or Firm* — Canon U.S.A., Inc. IP Division

(57) ABSTRACT

A lens apparatus includes a detector configured to detect a camera shake, a correction unit configured to correct an image shake caused by the camera shake based on the detected camera shake, a driving device configured to move the correction unit, a holder holding the detector, and a fiber assembly via which the holder holds the detector.

13 Claims, 6 Drawing Sheets

LENS APPARATUS, IMAGE PICKUP APPARATUS, AND CAMERA SYSTEM

BACKGROUND

Field

The present disclosure relates to a lens apparatus, an image pickup apparatus, and a camera system.

Description of the Related Art

There is known an interchangeable lens (lens apparatus) equipped with an image stabilizer to suppress deterioration of image quality due to a user's camera shake. Such an interchangeable lens includes a gyro sensor configured to detect an angular velocity of the interchangeable lens, and a vibration wave motor configured to drive an image stabilizer or a focus lens unit that moves in an optical axis direction at the time of focusing.

If vibration caused by an excitation frequency or resonance frequency of the gyro sensor interferes with vibration caused by a drive frequency of the vibration wave motor, resonance or beat may occur. As a result, a signal of the gyro sensor may be disturbed, and the image stabilizer may malfunction.

To cope with such a phenomenon, in an interchangeable lens described in Japanese Patent Application Laid-Open No. 2005-202261, a gyro sensor is installed on a material having viscoelasticity such as rubber or urethane. By installing the gyro sensor on the material having viscoelasticity, it is possible to suppress transmission of vibration of a vibration wave motor to the gyro sensor.

SUMMARY

Unfortunately, in the interchangeable lens described in Japanese Patent Application Laid-Open No. 2005-202261, the material having viscoelasticity may become hard in a low temperature environment and the damping performance may deteriorate. As a result, transmission of the vibration of the vibration wave motor to the gyro sensor cannot be sufficiently suppressed.

In consideration of the above-discussed issues, according to an aspect of the present disclosure, a lens apparatus is provided that is beneficial for reduction of vibration from a vibration wave motor to a gyro sensor.

According to another aspect of the present disclosure, a lens apparatus includes a detector configured to detect a camera shake, a correction unit configured to correct an image shake caused by the camera shake based on the detected camera shake, a driving device configured to move the correction unit, and a holder holding the detector, and a fiber assembly via which the holder holds the detector.

Further features of the present disclosure will become apparent from the following description of exemplary embodiments with reference to the attached drawings.

DESCRIPTION OF THE EMBODIMENTS

<Configuration of Camera System>

Figure 1:
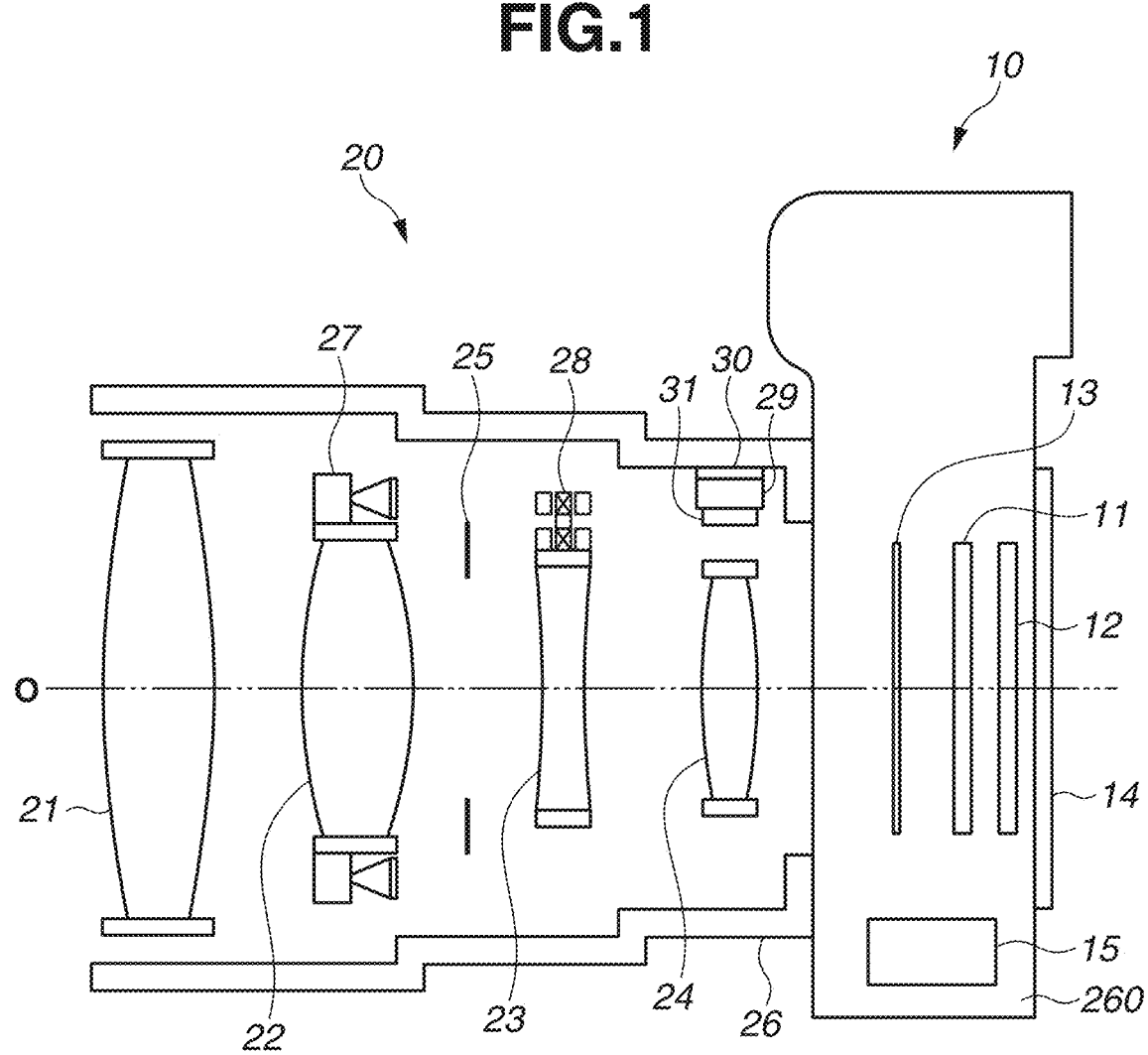
FIG. 1 is a schematic view of a camera system according to a first exemplary embodiment.

A first exemplary embodiment will be described below. FIG. 1 illustrates a camera system in the present exemplary embodiment. The camera system includes a camera body (image pickup apparatus) 10 and an interchangeable lens (lens apparatus) 20 removably mounted on the camera body 10. Instead of the interchangeable lens 20, a lens apparatus irremovably mounted on the camera body 10 may be employed. Further, a configuration in the interchangeable lens 20 may be replaced with a configuration described in second to fourth exemplary embodiments described below.

<Configuration of Camera Body>

A configuration of the camera body 10 will be described with reference to FIG. 1.

An image pickup element 11 includes a charge-coupled device (CCD) sensor, a complementary metal-oxide-semiconductor (CMOS) sensor, or the like. The image pickup element 11 picks up or captures an object image incident through the interchangeable lens 20. A circuit substrate 12 includes a central processing unit (CPU) configured to control units of the camera body 10, an image processing engine, or the like.

A mechanical shutter 13 adjusts an exposure time of the image pickup element 11.

A liquid crystal display 14 displays a real time image of an object image received by the image pickup element 11, a captured image, settings of the camera body 10, and the like. A battery 15 supplies power to components of the camera body 10 and the interchangeable lens 20.

The above-described components are provided inside or on a surface of a casing 260.

<Configuration of Lens Apparatus>

A configuration of the interchangeable lens 20 will be described with reference to FIG. 1.

The interchangeable lens 20 includes a front-side lens unit 21. A focus lens unit (optical member) 22 receives a driving force from a focus vibration wave motor 27 described below and is moved in the optical axis direction to perform focusing. An image-stabilizing lens unit 23 receives a driving force from a driving device or an image stabilization drive unit 28 described below and is moved in a direction orthogonal to the optical axis to perform image stabilization. The image stabilization drive unit 28 is controlled based on a result of detection by a gyro sensor 29. The image-stabilizing lens unit 23 is therefore a correction unit configured to correct an image shake caused by a camera shake, based on a result of detection of the camera shake by the gyro sensor 29.

An image stabilizing unit may be provided on the camera body 10 to move the image pickup element 11. That is, image pickup element stabilization may be performed in which the image pickup element 11 instead of the image-stabilizing lens unit 23 may be moved in the direction orthogonal to the optical axis. Both the image-stabilizing lens unit 23 and the image pickup element 11 may be moved in the direction orthogonal to the optical axis to perform the image stabilization.

The optical axis direction is a direction parallel to an optical axis O, and the direction orthogonal to an optical axis is a direction orthogonal to the optical axis O. The optical axis O is an optical axis of an imaging optical system including a plurality of lenses provided in the interchangeable lens 20.

The interchangeable lens 20 includes a rear-side lens unit 24. An aperture unit 25 adjusts an amount of light passing through the interchangeable lens 20 and reaching the side of the camera body 10. A fixed barrel (a holder, a holding member or a fixing member) 26 includes the lens units in the interchangeable lens 20 described above, a drive unit configured to drive the lens units, and a fixing section (holding section) configured to hold components of the interchangeable lens 20, such as a gyro sensor 29 described below.

A focus vibration wave motor 27 generates a traveling wave by applying two-phase drive signals having different phases to a piezoelectric element, to rotate a rotor. A drive frequency range of the focus vibration wave motor 27 in the present exemplary embodiment is 25 to 30 kHz. The drive frequency range of the focus vibration wave motor 27 is not limited to this. An image stabilization drive unit 28 is a voice coil motor (VCM). A vibration wave motor can also be employed as the image stabilization drive unit 28.

Figure 2:
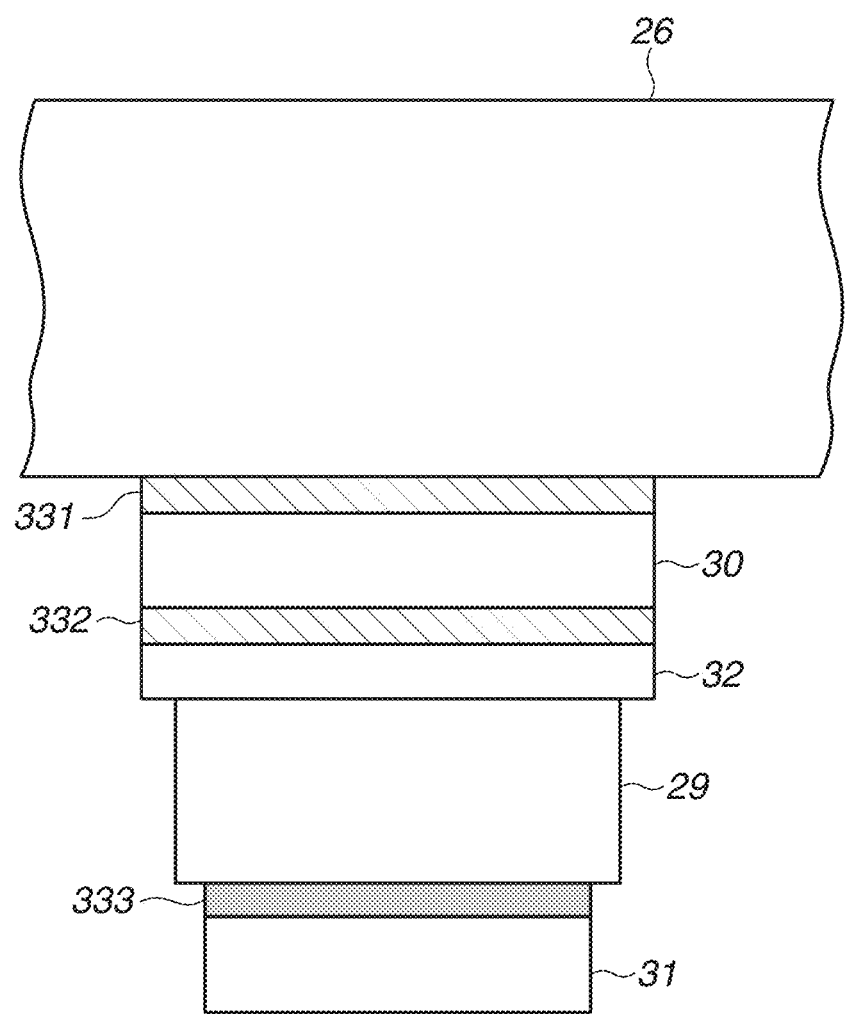
FIG. 2 is an enlarged view of a portion where a gyro sensor is fixed according to the first exemplary embodiment.

A gyro sensor 29 is a detector or a detection unit configured to vibrate a vibrator inside a sensor and detect a rotation angular velocity from a modulation of vibration due to Coriolis force to detect a camera shake. An excitation frequency for exciting the vibrator inside the sensor of the gyro sensor 29 according to the present exemplary embodiment is 50 kHz. It is noted that the excitation frequency of the gyro sensor 29 is not limited to this. As illustrated in FIG. 2, the gyro sensor 29 is mounted on a flexible printed substrate 32 described below.

A non-woven fabric 30 damps vibration transmitted to the gyro sensor 29. In the present exemplary embodiment, the non-woven fabric 30 is a sheet-like fabric in which polyester fibers and polyurethane fibers are randomly intertwined with each other. Here, the non-woven fabric 30 is a (three-dimensional) fiber assembly formed by boding or mechanically entangling each of individual fibers. A felt or an artificial felt may be used instead of the non-woven fabric 30, and any fiber assembly may be employed as long as the fibers are randomly intertwined with each other in three dimensions.

A mass addition member 31 is an auxiliary member for damping vibration transmission. In the present exemplary embodiment, the mass addition member 31 is made of stainless steel and has a shape of a rectangular parallelepiped. The shape of the mass addition member 31 is not limited to the rectangular parallelepiped. When the mass addition member 31 is provided, a vibration damping effect of the non-woven fabric 30 can be further enhanced.

<Method of Fixing Gyro Sensor>

A method of fixing the gyro sensor 29 will be described with reference to FIG. 2. FIG. 2 is an enlarged schematic view of a portion near the gyro sensor 29 in the interchangeable lens 20. An adhesive may be employed instead of a double-sided tapes 331, 332, and 333.

The gyro sensor 29 is mounted on and electrically connected to a flexible printed substrate 32. The non-woven fabric 30 adheres to the fixing barrel 26 with the double-sided tape 331. The flexible printed substrate 32 adheres to the non-woven fabric 30 with the double-sided tape 332. Therefore, as described above, the gyro sensor 29 is mounted on the flexible printed substrate 32, and thus, the gyro sensor 29 is fixed to the fixing barrel 26 via the non-woven fabric 30. The mass addition member 31 adheres to the gyro sensor 29 with the double-sided tape 333.

Figure 3:
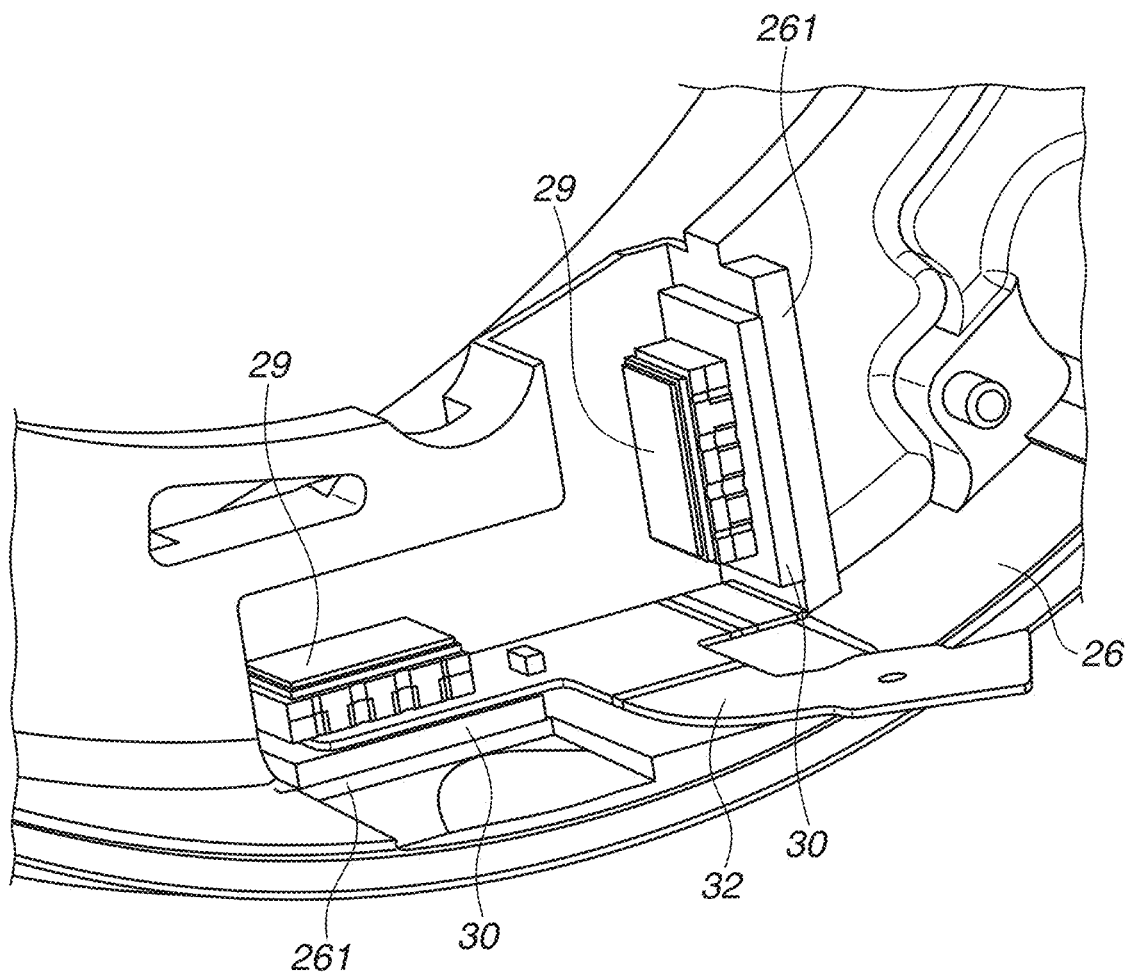
FIG. 3 is an enlarged view of a portion where a plurality of gyro sensors is fixed according to the first exemplary embodiment.

A configuration in which a plurality of gyro sensors 29 is provided on the fixing barrel 26 is illustrated in FIG. 3. As illustrated in FIG. 3, the fixing barrel 26 includes a fixing section (holding section) 261 configured to fix (hold) the gyro sensor 29. The non-woven fabric 30 is provided on the fixing section 261, and the gyro sensor 29 is provided on the non-woven fabric 30.

<Vibration Transmission and Damping Mechanism>

If the focus vibration wave motor 27 is driven, the vibration is transmitted to the fixing barrel 26. For example, assuming that the focus vibration wave motor 27 is driven at 25 kHz, a focus vibration having, particularly, 25 kHz and 50 kHz (second harmonic) of frequency components is transmitted to the fixing barrel 26. If this vibration is transmitted to the gyro sensor 29, the vibration interferes with 50 kHz of an excitation frequency of the gyro sensor 29, and as a result, an output signal is disturbed and a malfunction occurs.

On the other hand, in the present exemplary embodiment, provision of the non-woven fabric 30 can suppress the occurrence of the malfunction.

If the vibration propagates in the fixing barrel 26, the vibration is transmitted to the non-woven fabric 30. If the vibration is transmitted to the non-woven fabric 30, each of the fibers of the non-woven fabric 30 vibrates. At this time, the fibers are randomly intertwined with each other, and thus, directions of the fibers are different from one another. Therefore, if the fibers each vibrate, the fibers rub against one another. If the fibers rub against one another, a frictional heat is generated to damp the vibrational energy. In addition, if the fibers each vibrate, the fibers are each deformed. The vibrational energy is also damped by the deformation of the fibers. The vibration damped by the non-woven fabric 30 is transmitted to the gyro sensor 29. Therefore, in the present exemplary embodiment, the provision of the non-woven fabric 30 can suppress the occurrence of the malfunction.

Further, when the mass addition member 31 is provided, the deformation of each of the fibers can be further increased, and thus, the vibrational energy is further damped. (Comparison of Damping Performance Between Felt and Other Viscoelastic Body Under Normal Temperature Environment and Low Temperature Environment).

Table 1 shows results of measuring an acceleration under a normal temperature environment (23° C.) and a low temperature environment (−30° C.) where an accelerometer having substantially the same mass as that of the gyro sensor 29 was attached on a surface of the double-sided tape 332 of FIG. 2. In the measurement of the acceleration, the non-woven fabric 30 illustrated in FIG. 2 was used for the present exemplary embodiment, and rubber and urethane instead of the non-woven fabric 30 were used for Comparative Example. Values in Table 1 are dimensionless, assuming that the acceleration obtained when the rubber is used at 23° C. is 1. The focus vibration wave motor 27 was driven at 27 kHz. In each of the results shown in Table 1, the mass addition member 31 was not used.

As shown in Table 1, the acceleration of the rubber and the urethane at −30° C. is 10 times or more than that at 23° C. The increased acceleration indicates that the rubber and the urethane are hardened at a low temperature and the viscoelasticity characteristic changes to deteriorate the damping performance.

On the other hand, the acceleration of the non-woven fabric 30 at −30° C. is lower than that of the rubber and the urethane, and the damping performance is not significantly reduced even at a low temperature. Likewise, the acceleration of the non-woven fabric 30 at −30° C. is greater than that at 23° C., however, a change in acceleration is smaller than that of the rubber and the urethane.

A reason why the non-woven fabric 30 can easily maintain the damping performance under a low temperature environment is as follows. Fibers themselves of the non-woven fabric 30 are hardened at −30° C. Accordingly, an amount of vibrational energy to be damped due to the deformation of each of the fibers described above is reduced. However, the amount of vibrational energy to be damped due to the friction between fibers occurring even at −30° C. is not reduced. The damping performance, therefore, does not decrease greatly even at a low temperature.

TABLE 1

| Temperature | Rubber | Urethane | Non-woven fabric |
| --- | --- | --- | --- |
| 23° C. | 1 | 0.5 | 0.1 |
| −30° C. | 18.7 | 6 | 0.2 |

Figure 4:
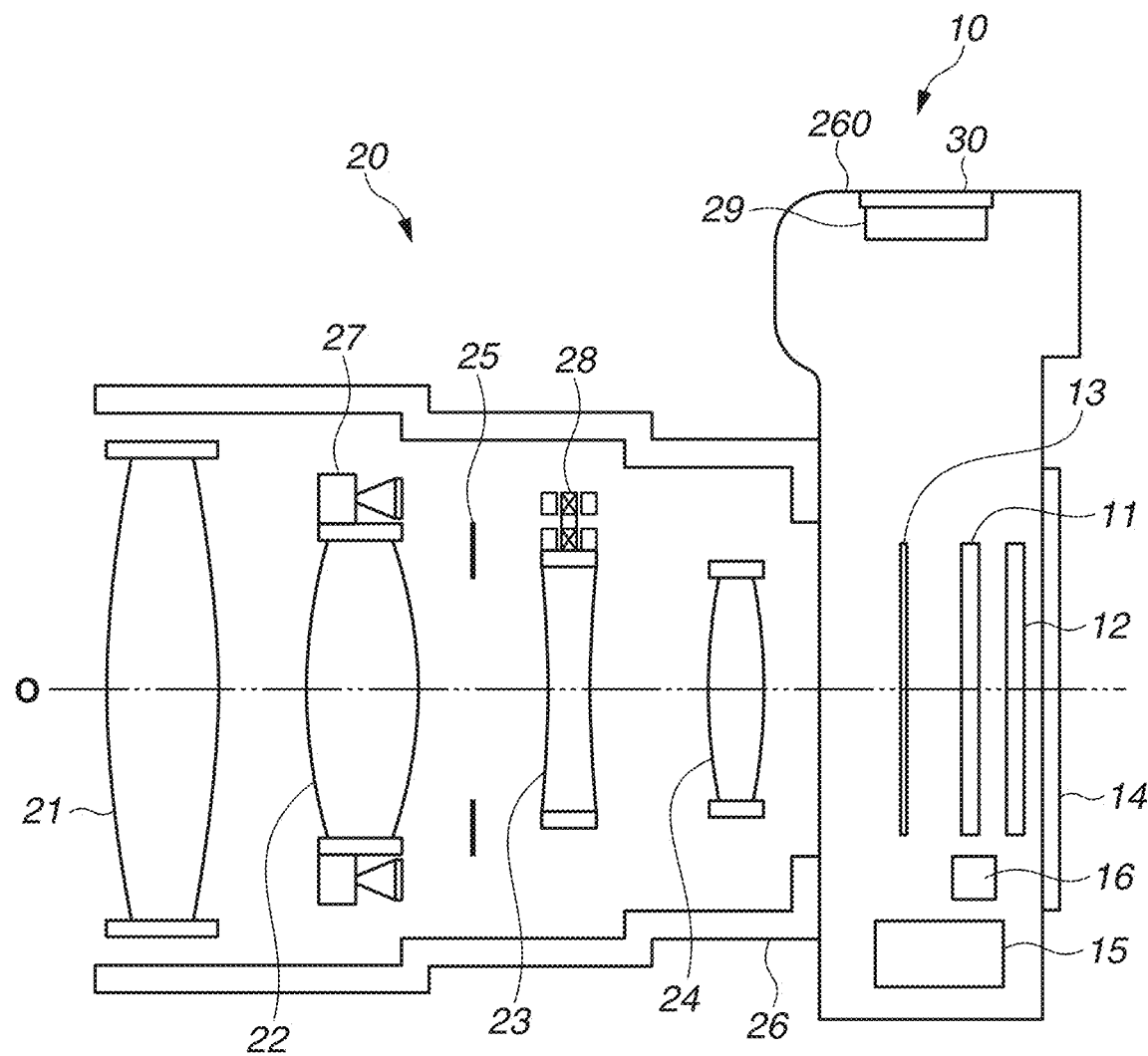
FIG. 4 is a schematic view of a camera system according to a second exemplary embodiment.

A second exemplary embodiment will be described below. FIG. 4 illustrates a camera system according to the second exemplary embodiment. Unlike the first exemplary embodiment, in the present exemplary embodiment, the camera body 10 includes the gyro sensor 29. More specifically, the non-woven fabric 30 is provided between a fixing section (holding member) provided on the casing 260 of the camera body 10 and the gyro sensor 29 to fix the gyro sensor 29. The fixing section mentioned here is, for example, a concave portion provided on the surface of the casing 260. The gyro sensor 29 is provided on the non-woven fabric 30 laid on a bottom surface of the concave portion, and another member being a lid is further placed on the gyro sensor 29.

Particularly, in the present exemplary embodiment, when the image pickup element 11 is moved in the direction orthogonal to an optical axis to perform the image stabilization, it is possible to suppress an influence of vibration from the image pickup element drive unit 16 configured to drive the image pickup element 11 in the direction orthogonal to the optical axis.

Figure 5:
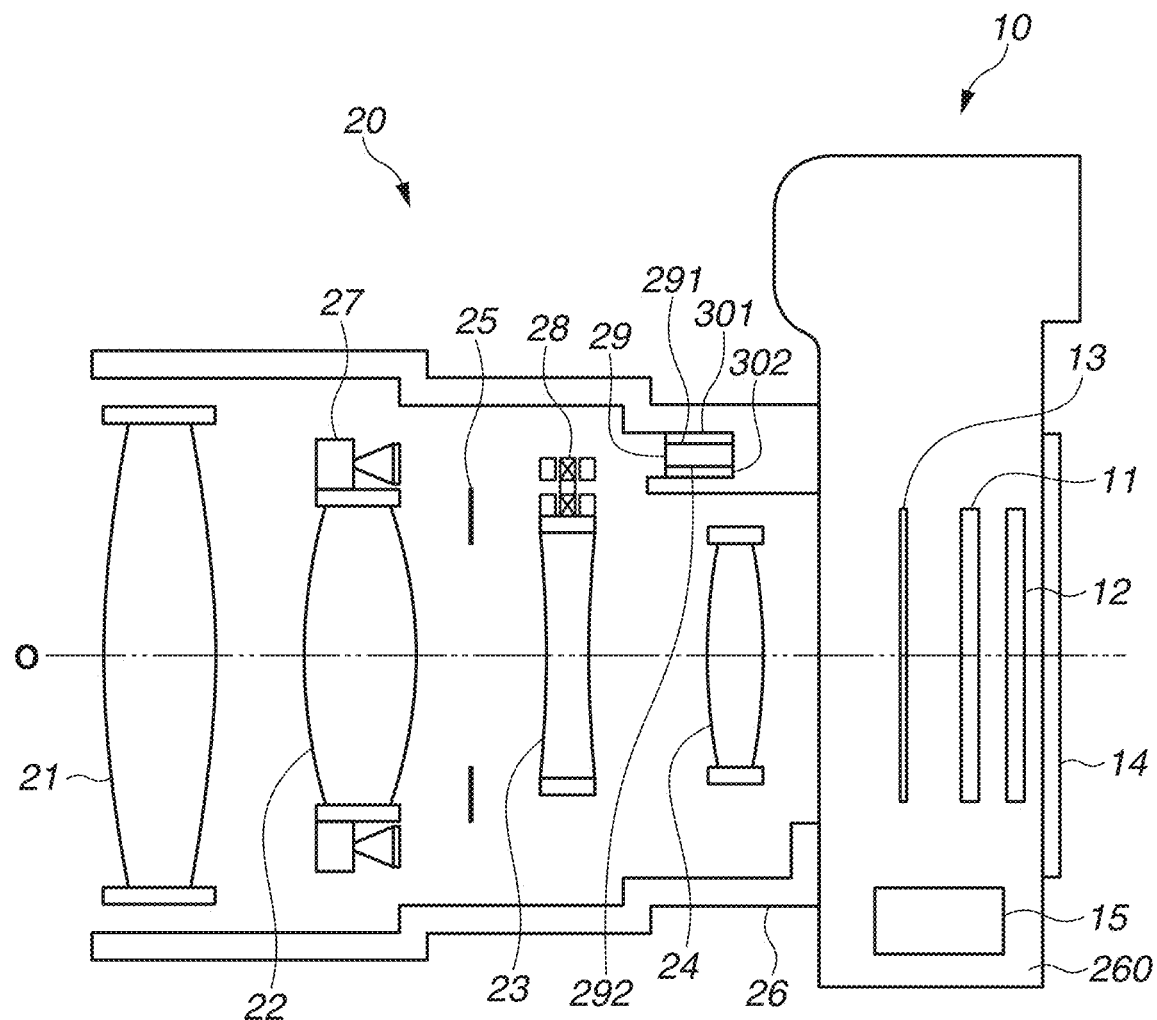
FIG. 5 is a schematic view of a camera system according to a third exemplary embodiment.

A third exemplary embodiment will be described below. FIG. 5 illustrates a camera system according to the third exemplary embodiment. A method of fixing the gyro sensor 29 is different from that in the first exemplary embodiment. In the first exemplary embodiment, only one non-woven fabric 30 is provided between the gyro sensor 29 and the fixing barrel 26 as illustrated in FIG. 1 to FIG. 3. On the other hand, in the present exemplary embodiment, two non-woven fabrics are provided between the gyro sensor 29 and the fixing barrel 26. More specifically, as illustrated in FIG. 5, a first non-woven fabric (first fiber assembly) 301 is provided between a surface 291 on one side of the gyro sensor 29 and the fixing barrel 26. A second non-woven fabric (second fiber assembly) 302 is provided between a surface 292 on the other side of the gyro sensor 29 and the fixing barrel 26.

In the present exemplary embodiment, more non-woven fabrics are used than in the first exemplary embodiment, and thus, it is possible to further suppress the transmission of vibration of the vibration wave motor to the gyro sensor than in the first exemplary embodiment.

Figure 6:
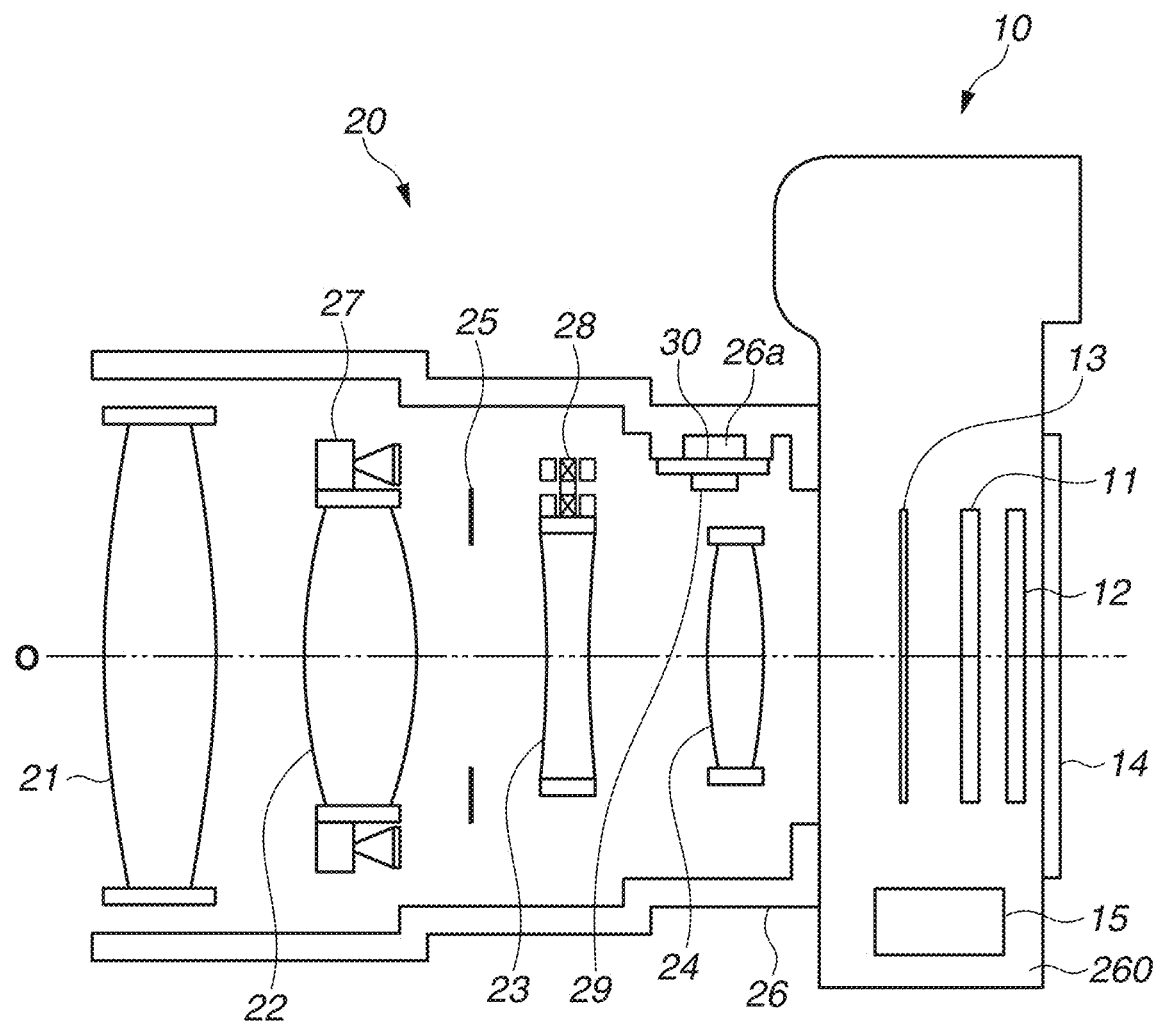
FIG. 6 is a schematic view of a camera system according to a fourth exemplary embodiment.

A fourth exemplary embodiment will be described below. FIG. 6 illustrates a camera system according to the fourth exemplary embodiment. A method of fixing the gyro sensor 29 is different from that in the first exemplary embodiment.

In the first exemplary embodiment, an entire surface of the non-woven fabric 30 on the fixing barrel 26 side is fixed to the fixing barrel 26 with the double-sided tape 331. On the other hand, in the present exemplary embodiment, as illustrated in FIG. 6, only a part of the surface of the non-woven fabric 30 on the fixing barrel 26 side is fixed to the fixing barrel 26. A cavity 26a is provided between the surface of the non-woven fabric 30 on the fixing barrel 26 side and the fixing barrel 26.

In the present exemplary embodiment, the cavity 26a is newly provided unlike in the first exemplary embodiment, and thus, it is possible to further suppress the transmission of vibration of the vibration wave motor to the gyro sensor than in the first exemplary embodiment.

As described above, in each of the exemplary embodiments, configuration is such that the gyro sensor 29 is fixed to the fixing barrel 26 of the interchangeable lens 20 via the non-woven fabric 30, which is a fiber assembly. As a result, the vibration from the focus vibration wave motor 27 can be damped regardless of the temperature environment. Further, even at a room temperature, the vibration can be further damped as compared to conventionally used rubber and urethane. That is, it is possible to provide a lens apparatus, an image pickup apparatus, and a camera system, in which transmission of vibration of a vibration wave motor to a gyro sensor can be suppressed while an influence of a temperature change can be reduced.

As mentioned above, although the exemplary embodiments of the present disclosure are described, embodiments are not limited to these exemplary embodiments, and various modifications and changes are possible within the range of the gist of the present disclosure. For example, the configuration described in the third or fourth exemplary embodiment may be applied to the camera body 10 in the second exemplary embodiment.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189287, filed Oct. 4, 2018, which is hereby incorporated by reference herein in its entirety.

What is claimed is:

1. A lens apparatus comprising:
   a detector configured to detect a camera shake;
   a correction unit configured to correct an image shake caused by the camera shake based on the detected camera shake;
   a driving device configured to move the correction unit; and
   a holder holding the detector,
   wherein the detector is held indirectly by the holder such that a flexible printed substrate to which the detector is connected and a fiber assembly formed of a felt or a non-woven fabric are interposed between the detector and the holder.

2. The apparatus according to claim 1,
   wherein the correction unit includes a lens configured to move in a direction orthogonal to an optical axis of the apparatus.

3. The apparatus according to claim 1, further comprising a mass addition member arranged with the detector.

4. The apparatus according to claim 1, wherein fibers of the fiber assembly are intertwined with each other in three dimensions.

5. The apparatus according to claim 1,
wherein the correction unit includes an image pickup element.

6. The apparatus according to claim 1, wherein the holder is a casing in the apparatus.

7. The apparatus according to claim 1, wherein the holder comprises a fixed barrel of the apparatus.

8. A camera system comprising:
a lens apparatus;
an image pickup apparatus including an image pickup element and a casing holding the image pickup element;
a detector configured to detect a camera shake;
a correction unit configured to correct an image shake caused by the camera shake based on the detected camera shake;
a driving device configured to move the correction unit; and
a holder holding the detector,
wherein the detector is held indirectly by the holder such that a flexible printed substrate to which the detector is connected and a fiber assembly formed of a felt or a non-woven fabric are interposed between the detector and the holder.

9. The camera system according to claim 8,
wherein the correction unit includes a lens configured to move in a direction orthogonal to an optical axis of the lens apparatus.

10. The camera system according to claim 8, further comprising a mass addition member arranged with the detector.

11. The camera system according to claim 8, wherein fibers of the fiber assembly are intertwined with each other in three dimensions.

12. The camera system according to claim 8, wherein the holder is a casing in the image pickup apparatus.

13. The camera system according to claim 8, wherein the holder comprises a fixed barrel of the lens apparatus.

* * * * *